United States Patent [19]

Lin et al.

[11] Patent Number: 5,072,308
[45] Date of Patent: Dec. 10, 1991

[54] COMMUNICATION SIGNAL COMPRESSION SYSTEM AND METHOD

[75] Inventors: Daniel Lin, Montville; Scott D. Kurtz, Mount Laurel, both of N.J.; Brian M. McCarthy, Lafayette Hill, Pa.; James M. Kresse, Marlton, N.J.

[73] Assignee: International Mobile Machines Corporation, King of Prussia, Pa.

[21] Appl. No.: 617,789

[22] Filed: Nov. 26, 1990

Related U.S. Application Data

[63] Continuation of Ser. No. 369,292, Jun. 21, 1989, Pat. No. 4,974,099.

[51] Int. Cl.$^5$ .............................................. H04N 1/41
[52] U.S. Cl. ................................... 358/426; 358/428; 378/122
[58] Field of Search ............... 358/426, 428, 429, 433; 382/56; 341/51; 375/122

[56] References Cited

U.S. PATENT DOCUMENTS

| | | |
|---|---|---|
| 4,291,329 | 9/1981 | Ogawa et al. ....................... 358/428 |
| 4,623,922 | 11/1986 | Wischermann ..................... 358/428 |
| 4,783,698 | 11/1988 | Harmey ............................... 358/428 |
| 4,974,099 | 11/1990 | Lin et al. ............................. 358/426 |

FOREIGN PATENT DOCUMENTS

| | | | |
|---|---|---|---|
| 0138628 | 12/1978 | Japan .................................. 358/428 |
| 0141525 | 12/1978 | Japan .................................. 358/428 |

OTHER PUBLICATIONS

Moreno et al., Envelope and Instantaneous Phase in Residual Representation, (4 pages), 1988.

Primary Examiner—Edward L. Coles, Sr.
Attorney, Agent, or Firm—Volpe and Koenig

[57] ABSTRACT

A telecommunication system and method for communicating communication signals between various stations over a selected carrier medium. An improved encoder and method is provided for compressing a communication signal into a selectively formatted encoded signal to facilitate its transmission over the selected carrier medium. The method is particularly useful for encoding fax and modem data signals which do not exhibit the harmonics of a voice signal. A decoder and method for reconstruction of the encoded signal are also provided.

36 Claims, 4 Drawing Sheets

COMMUNICATION SIGNAL COMPRESSION SYSTEM AND METHOD

This is a continuation of application Ser. No. 07/369,292, filed 6/21/89, now U.S. Pat. No. 4,974,099.

The present invention relates to communication systems and in particular to the compression of communication signals to facilitate increased capacity of the communication system.

BACKGROUND OF THE INVENTION

Telecommunication systems are well known in the art. From the seminal work of Samuel Morse, U.S. Pat. No. 1,647 (1840) and Alexander Graham Bell, U.S. Pat. No. 174,465 (1876), an entire industry of telecommunications has developed spanning the globe and beyond.

The encoding of messages as well as timing has played a key role throughout the historical development of communication systems. For example, prior to the invention of the telephone, messages were encoded into Morse Code and corresponding electronic pulses transmitted the encoded message over telegraph lines which would then be received and decoded. Thereafter a response could be communicated reversing the operations. Manual encoding and decoding of messages prohibited the direct real time communications between two persons.

With the advent of the telephone, real time communication was made possible through the electronic encoding of voice patterns into communication signals which signals were carried over wires between two telephones. The speed of the electronic communication signal, which far exceeded the speed of sound, permitted real time voice communication between individuals at substantial distances without significantly perceptible time delay.

Today communication signals are not constrained to wires but are also carried by a microwave, radiowave and optic fibers. These advances have permitted global real time telecommunications. Moreover, real time communication service is expected by the consuming public.

Unlike conventional hard wired telephone systems where a single telephone communication signal is carried on a pair of wires, time division multiplexing has been utilized to increase the capacity of the various carrier mediums. For example, many communication signals can be multiplexed together and carried over a single optic fiber. Accordingly a single optic fiber cable can replace a hundred pair wire cable and provide even greater signal carrying capacity.

The same principle has been employed with respect to radio telephone systems. Radio telephone systems for both stationary and mobile uses are well know in the art. For example, in remote rual areas where installation and maintenance of conventional telephone wire lines is prohibitive, radio telephone systems permit the broadcast between a base and sundry subscriber stations to facilitate telephone service. Mobile radio telephone systems are also becoming increasingly more prevalent in the form of the cellular car phones which have become widely available.

Radio telephone systems utilize a group of selected radio frequencies for carrying the communication signals in lieu of wire cables. A typical stationery radio telephone system may include 13 pairs of selected frequencies or channels over which communication signals are broadcast and received between subscriber stations and a common base station.

Due to the fact that only a limited band of frequencies is permitted for radio telephone usage, time division multiplexing has been employed to permit increased capacity of radio telecommunication systems. For example, U.S. Pat. No. 4,675,863 discloses a stationary radio telephone system which utilizes 26 channel pairs each of which can carry up to four communication signals at one time.

Unlike fiber optic communication transmissions which can speed communication signals to and from their destination in the gigahertz range, carrier radio frequencies (channels) are significantly more limited in their capacity.

In order to increase the capacity of the radio channels, voice signal compression techniques have been utilized. One technique which has proved successful is Residual Excited Linear Predictive coding (RELP) such as disclosed in U.S. Pat. Application No. 667,446, filed Nov. 2, 1984. RELP permits the compression of a 64 kilobits per second voice communication signal into an 14.6 kilobits per second encoded signal which is transmitted over the radio channel. The 14.6 kilobit per second is decoded when it is received to reconstruct a 64 kilobits per second signal with virtually no perceptible loss in signal quality.

Underlying the mechanics of RELP is a recursive encoding and decoding formulation which relies upon the harmonics of the human voice which provide statistically predictable wave patterns. Unlike voice transmissions, however, data communication signals, such as modem and fax (telecopier) signals, do not exhibit the harmonic qualities which are characteristic of voice signals. Accordingly, the RELP signal compression technique which is employed for voice signals is not entirely suitable for fax and modem communication signals. It would be desirable to provide a more suitable coding compression system for data signals.

SUMMARY AND OBJECTS OF THE INVENTION

A radio telephone system is provided which includes means for encoding the signal to compress it to facilitate increased communications capacity by permitting time division multiplexing of radio telephone signals. The system is characterized in its identification of the type of communication signals, such as between voice, fax or modem, and the utilization of different compression methods according to the type of communication signal. An improved method of compressing both fax and modem signals is provided.

An object of the present invention is to provide a radio telephone system which is transparent to the user irrespective of the telecommunication of voice, fax or data. It is a further object the invention to provide an improved data signal compression method.

Other objects and advantages of the invention will be apparent from the following description of a presently preferred embodiment.

DETAILED DESCRIPTION OF A PRESENTLY PREFERRED EMBODIMENT

Figure 1:
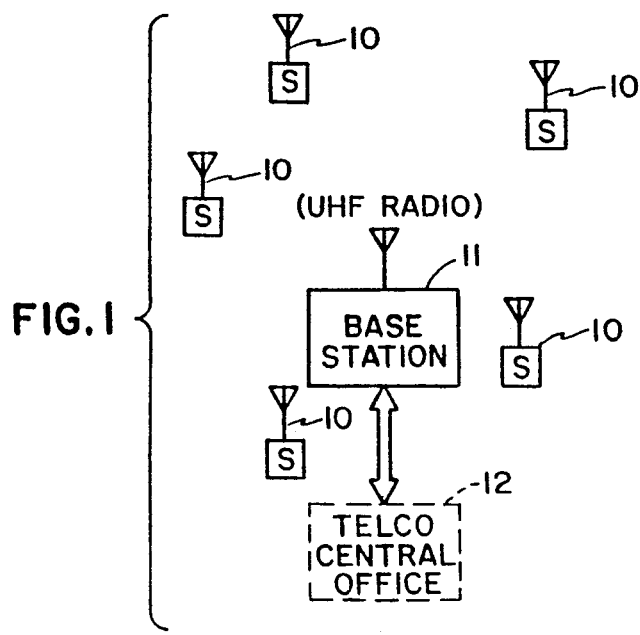
FIG. 1 is a schematic diagram of a radio telecommunication system which can utilize the improved data compression processing in accordance with the teachings of the present invention.

Referring to FIG. 1, there is shown schematically a base station 11 and a plurality of subscriber stations 10 of a radio telephone system network. The base station 11 is designed to communicate with a number of the subscriber stations 10 simultaneously through the broadcast and reception of radio waves over selected frequencies. The base station is also interfaced with telephone company (TELCO) trunk lines 12. The subscriber units 10 may be stationary such as to provide telephone service to remote areas where the construction of telephone lines is physically impractical and/or cost prohibitive. Alternatively, the subscriber stations 10 may be mobile units such as a car phone.

A typical system may utilize 26 predetermined channels in the 450 megahertz spectral region. The number of channels is generally limited due to governmental allocation of select port ions o f the radio spectrum for radio telephone communications. For example, the Federal Communication Commission (FCC) provides specific regulations in this regard in the U.S.

Base station-subscriber station communication is generally performed over pairs of frequency channels within the designated spectral band. Preferably the base station transmits signals on the lower of the two frequencies in each pair and receives signals from the subscriber station on the higher of the two frequencies of each pair. In a system where 26 frequency channels are available, the base station is designed to simultaneously transmit and receive signals over 13 different channel pairs.

In order to increase the capacity of such a radio, telephone system, time division multiplexing of communication signals has been utilized. For example, in the radio telephone communication systems disclosed in U.S. Pat. No. 4,675,863, issued June 23, 1987, entitled SUBSCRIBER RF TELEPHONE SYSTEM FOR PROVIDING MULTIPLE SPEECH AND/OR DATA SIGNALS SIMULTANEOUSLY OVER EITHER A SINGLE OR A PLURALITY OF RF CHANNELS (Wilson et al.), which is hereby incorporated by reference as if fully set forth, a telephone system is disclosed which permits up to four communication signals to be communicated over a single pair of radio channels.

Accordingly, each channel pair is divided into four time slots such that the base station can be simultaneously communicating with four different subscriber stations over a single channel pair. This effectively increases the capacity of the radio telephone system four told so that over 50 telecommunication signals can be simultaneously communicated over the 13 channel pair radio system. In practice, one of the 52 time slots defined in the 13 channel pairs is reserved for performing system overhead functions, such as the assignment of channels and time slots for the specific telecommunication signals being communicated with selected subscriber stations. Such a time division multiplexing radio telephone system can easily provide normal telephone service for 500 or more subscriber stations.

One such radio telecommunication system which operates using time division multiplexing is the Ultraphone ® system commercialy available from the International Mobile Machines, Incorporated, the assignee o the present invention.

In order to effectuate the increased communication capacity of the eh radio channel paris through item division multiplexing, the standard communication signals between subscribers are compressed to fit within the tie slot accorded by the time division multiplex system. For example, with reference to U.S.. Pat. No. 4,687,863, noted above, a typical digitized communication signal of a 64 kilobits per second is compressed into an encoded signal of approximately 14.6 kilobits per second.

In practice a standard analog telecommunication signal is initially converted into a 64 kilobits per second digital signal. Preferably, the signal is concerted into an eight bit byte signal thereby producing an 8 kilobyte per second digital signal.

In the above-referenced conventional system, the communication signal is processed in increments of 22.5 microseconds. This results in 180 byte samples of the 8 kilobyte per second digital communication signal being processed in each successive frame of the radio telephone system channel. The time division multiplex frame for each channel pair is designed to accommodate a 14.6 kilobit per second encoded signal. For a given 22.5 millisecond frame, this is equivalent to 41 eight bit bytes of information per frame. Accordingly, for each frame, the information contained in the 180 byte samples must be encoded into no more than 41 bytes for transmission in one of the time slots of a selected frequency channel. Moreover, the encoded 41 bytes must, upon reception at the receiving station, be reconstructed into 180 byte samples for each frame without perceptible distortion or loss of information contained in the communication signal.

For voice transmissions, it is known to utilize a Residual Excited Linear Predictive encoding system (RELP) to process a 180 byte sample into a 41 byte encoded signal which is capable of being reconstructed into an acceptable equivalent 180 byte sample. The RELP encoding system relies upon the use of certain inherent pitch characteristics of a voice signal. Such an encoding system is referenced in U.S. Pat. No. 4,675,863 and is described in detail in U.S. Pat. application Ser. No. 667,444, filed Nov. 2, 1984, entitled RELP VOCODER IMPLEMENTED IN DIGITAL SIGNAL PROCESSORS (Wilson et al.), PCT International Publication No. WO 86/02726, published May 9, 1986, which patent application is hereby incorporated by reference as if fully set forth.

While RELP encoding has proven satisfactory for voice signals it is not entirely suitable for the encoding of fax (telecopy) and/or modem communication signals.

These signals do not exhibit the harmonic and pitch characteristics of a voice signal. Accordingly, the underlying recursive algorithms upon which RELP is based do not adequately facilitate the encoding of such signals. Nevertheless, the hardware processors suitable for RELP data compression are suitable for the compression technique of the present invention. For example, the Texas Instrument Model TMS 32020 Digital Signal Processor is preferred for the implementation of the instant compression process.

Figure 2:
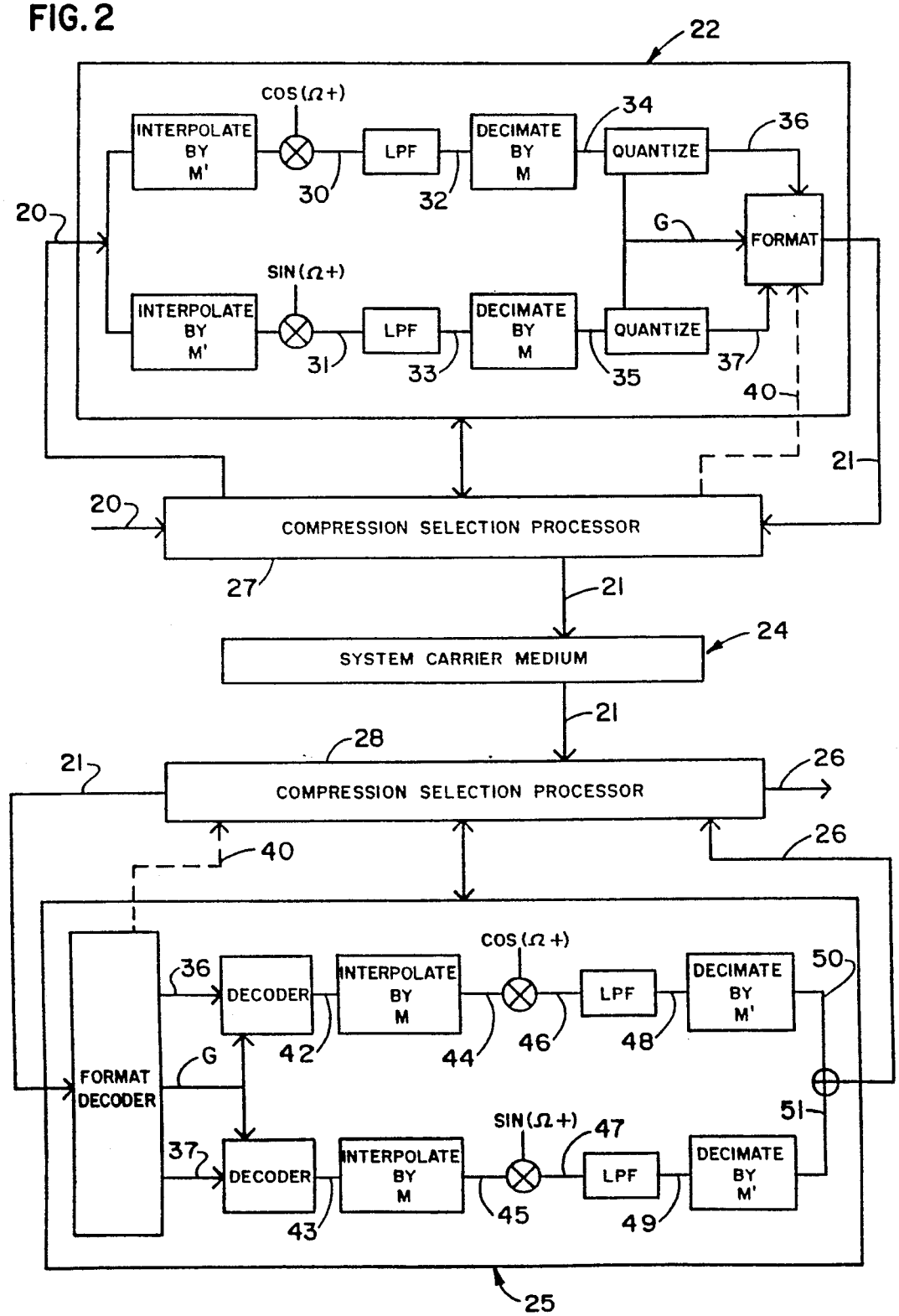
FIG. 2 is a diagrammatic illustration of the data compression and decoding of communication signals in accordance with the teachings of the present invention.

In order to improve the transmission of fax and modem signals in such radio telephone communication systems, an improved coding technique and implementation system therefor has been devised. With reference to FIG. 2, there is shown schematically applicant's inventive encoding and decoding system for communication signals, particularly fax and data signals.

The processing of the communication signal from its standard analog form into a digital 64 kilobits per second (8 kilobytes per second) digital signal for processing in 180 byte samples per frame is standardized within the overall radio telecommunication system for the processing of all communication signals. When fax and/or data signals are being communicated, the 8 kilobyte per second digital signal 20 is encoded into a selectively formatted coded signal 21 by a coding processor 22. The coded signal 21 is transmitted in a selected time slot of one of the systems radio channels 24 which each contain several slots defined by time division multiplexing. The receiving station includes a decoding processor 25. The encoded signal 21 is directed to the decoder 25 for processing to reconstruct a communication signal 26 which is substantially equivalent to the original signal 20. Both the transmitting station and the receiving station include a compression selector processor 27, 28 which coordinates the respective encoding and/or decoding activity as discussed below with respect to FIG. 7. In practice, each station includes both an encoder 22 and a decoder 25 for duplex station-station-communication. Moreover, the compression selector processor, encoder and decoder may all be implemented in a single micro processor such as a Texas Instrument Model TMS 32020 Digital Signal Processor.

The encoding processor 22 first interpolates the communication signal 20 by a selected factor M' to increase the sample size. The augmented sample is then split into its in-phase and quadrature components 30, 31 through the multiplication by the $\cos(\Omega t)$ and $\sin(\Omega t)$, respectively. This results in the simultaneous processing of two bit streams of information 30, 31. $\Omega$ is chosen as the approximate center frequency of the frequency domain representation of the signal. The mixing by $\cos(\Omega t)$ and $\sin(\Omega t)$ respectively, displaces the center of the frequency domain of the communication signal from $\Omega$ to 0Hz.

After mixing, each respective signal 30, 31 is low passed filtered to remove frequency components over a selected level in the frequency domain. This eliminates distortion and echo frequency components centered on even multiples of $\Omega$.

Each filtered sample 32, 33 is then decimated by a selected factor M to reduce the sample size for quantization. The decimated signal 34, 35 for both the in-phase and quadrature components are then quantized into a selected number of levels with an adaptive pulse code modulator coder which results in quantized signal samples 36, 37 and a quantization gain component G. The respective quantized signal samples and gain component, along with a unique word 40, are then formatted into the encoded signal 21 which has a selected frame structure. Although separate gain components may be generated for the in-phase and quadrature components, a common gain value of the most significant eight bits is satisfactory for the compression of the 8 kilobyte per second signal into an encoded 14.6 kilobit per second signal.

The frame structure conforms with the format requirements of the slots allocated for communication signals in the time division multiplexed channels of the radio telephone system. In the preferred system, the frame format is 41 bytes per frame. The unique word 40 conveys the information relating to the type of signal being communicated, i.e. voice, fax, or modem, and timing information. In the receiver, the received encoded frame is processed in accordance with this information.

The decoding processor 25 of the receiving station separates the quantized signal samples 36, 37 and quantization gain G for the respective in-phase and quadrature components. Decoding of the quantized signals 36, 37 is then performed in accordance with the quantization gain parameter G resulting in communication signal samples 42, 43 which are informationally equivalent to the pre-quantized, decimated samples 34, 35. Thereafter the signal samples 42, 43 for both in-phase and quadrature components are successively interpolated by the factor M.

The interpolated in-phase signal 44 is then again mixed with $\cos(\Omega t)$ and the interpolated quadrature signal 45 is then again mixed with $\sin(\Omega t)$. Both signals 46, 47 are then low pass filtered at the same level for which filtering was conducted following the initial mixing of the signals. Each filtered signal 48, 49 is decimated by the factor M' and the two signals are summed to reconstruct a communication signal 26 equivalent to the initial 8 kilobyte signal 20. Although it is possible to synchronize the encoding and decoding processes, synchronization is not required.

In the preferred embodiment, compatible with the system disclosed in U.S. Pat. No. 4,675,863, when encoding of the digitized 8 kilobyte per second communication signal 20, the encoding processor 22 encodes a 180 byte sample into a 41 byte frame structure for time division multiplex transmission over a selected radio telephone system channel.

Figure 4:
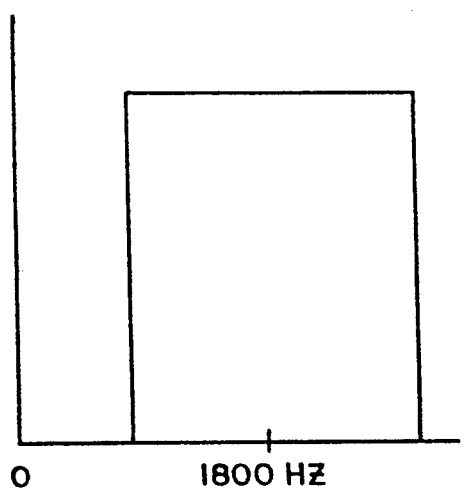
FIG. 4 is a graphic illustration of the frequency of a typical fax communication signal.
Figure 3:
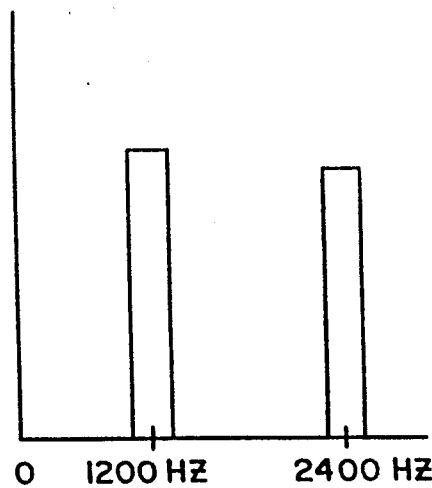
FIG. 3 is a graphic illustration of the frequency doman of a split band modem communication signal

As illustrated in FIG. 3, split band modem communication signals are relatively narrowly centered about either 1200 hertz (representing data transmission from the originating modem) or 2400 hertz (representing data transmission from the answering modem). Fax communication signals are typically centered about 180 hertz in a broader range as illustrated in FIG. 4.

Preferably when a fax signal is being communicated, the signal is interpolated by a factor of three, thereby increasing the frame sample size to 540 samples per frame. Mixing is then effectuated for in-phase and quadrature components by $\cos(1800t)$ and $\sin(1800t)$, respectively. Low pass filtering is performed to eliminate frequencies higher than 1400 hertz. The respective in-phase and quadrature components 32, 33 are then decimated by a factor of 10 resulting in a reduction in a sample size to 54 samples for each component of the frame.

The in-phase and quadrature samples 34, 35 are then quantized into 6 levels with an adaptive pulse code modulation coder resulting in the quantized representation of the samples 20 36, 37 and a quantization gain factor G of 8 bits. The encoded quantized representations of the respective 54 byte samples per frame of each component are encoded into an eight bit bytes which each represent a group of three quantized signal samples. Thus the 54 samples of the respective components remaining after decimation are represented by 18 bytes which each represent quantized value of three of the 54 samples and the 8 bit gain factor G.

Figure 5:
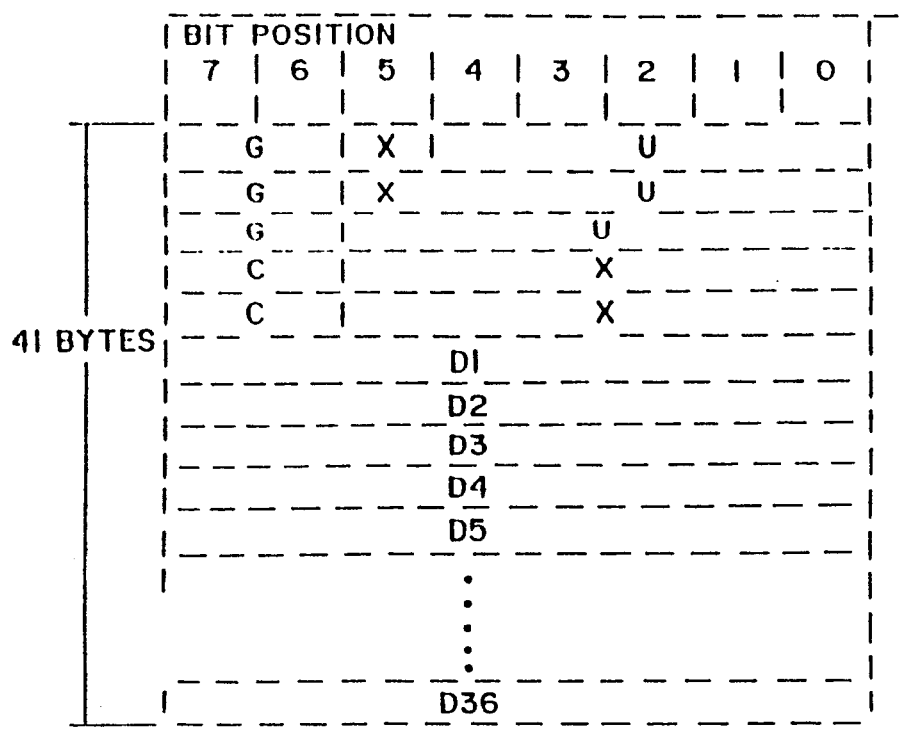
FIG. 5 is a diagrammatic illustration of the frame structure utilized in transmitting a compressed fax signal in accordance with the teachings of the present invention.

Accordingly a total of 36 eight bit bytes D1-D36 and the 8 bit gain factor G are formatted into a 41 byte frame for data transmission by the radio telecommunication system such as depicted in FIG. 5. The 16 bit unique word U, a 4 bit error checking code C and 12 unused bits X fill out the frame to total the 41 bytes.

After the frame is transmitted and received over the carrier medium, the formatted frame is then decoded separating the 8 bit gain factor G and the 18 in-phase and 18 quadrature quantized bytes. The quantized signals 36, 37 are then respectively decoded in accordance with the quantization gain factor G resulting in 54 eight bit samples 42, 43 which contain information essentially equivalent to the prequantized, decimated in-phase and quadrature signals 34, 35, respectively.

The decoded in-phase and quadrature samples 42, 43, respectively, are then interpolated by a factor of 10 to increase the sample size to 540. The resulting signal 44 of the in-phase component is then mixed with cos(1800t). Similarly the quadrature component 45 is mixed with sin(1800t). The samples 46, 47 are then low pass filtered to remove frequency domain components above 1400 hertz. Thereafter, the resultant in-phase and quadrature components 48, 49 are each decimated by a factor of 3 to reduce the sample size to 180 eight bit samples in the frame. Finally, the signals 50, 51 are summed to produce a communication signal 26 which is substantially equivalent to the initial 8 kilobyte per second signal 20.

For modem transmission, the parameters used for data compression are slightly different. As with fax signals each 180 byte per frame digital signals is interpolated by a factor of 3 to increase the sample size to 540. The mixing of the signal into in-phase and quadrature components by $\cos(\Omega t)$ and $\sin(\Omega t)$, respectively is performed with $\Omega$ equal to either 1200 hertz or 2400 hertz depending upon whether the signal is emanating from the originating or answering modem.

Low pass filtering is applied with a cut off frequency of 700 hertz. The lower level of low pass filtering for modem signals, in comparison to fax signals, is due to the relatively narrow band width of the frequency domain of the modem signal about 1200 and 2400 hertz.

Figure 6:
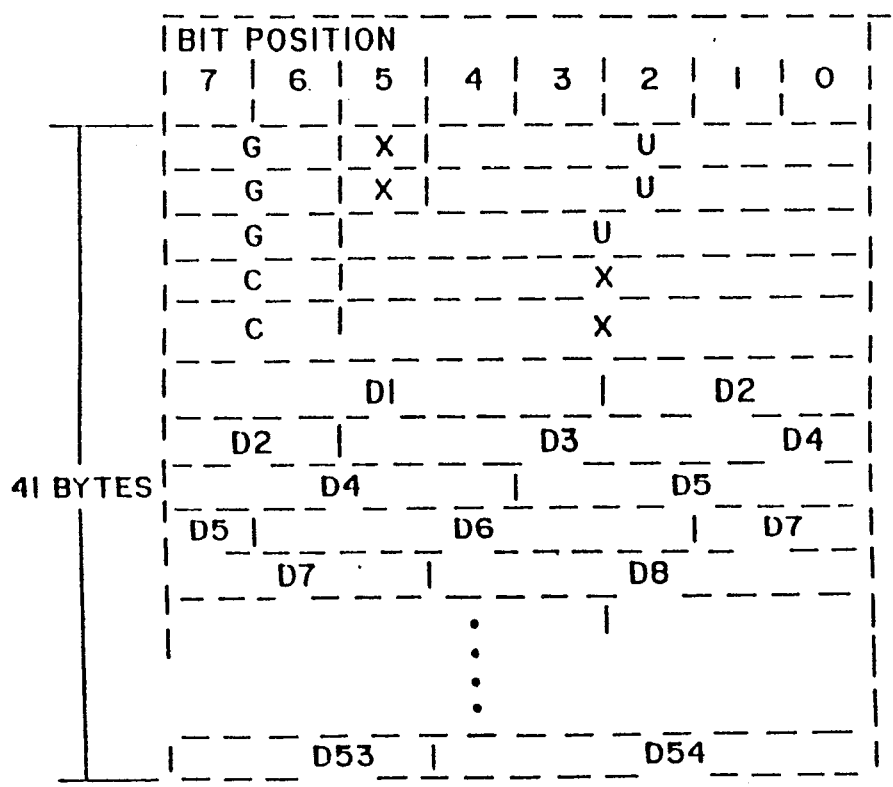
FIG. 6 is a diagrammatic illustration of the frame structure utilized in transmitting a compressed modem signal in accordance with the teachings of the present invention.

After filtering, the signal is decimated by a factor of 20 to reduce samples to 27 samples per frame. The respective in-phase quadrature samples are quantized into 32 levels with an adaptive PCM coder. This results in 27 five bit quantized representations D1-D54 of the decimated samples for each of the respective in-phase and quadrature components along with an 8 bit quantization gain factor G. This information along with the 16 bit unique word U, a four bit error checking code C, and 12 unused bits X, is formatted into a 41 byte frame structure for transmission in the selected time slot of the selected frequency channel pair over which radio telecommunications is being conducted. FIG. 6 represents the frame structure for such data communication. Note that preferably the unique word U is always formatted in the same position irrespective of signal type.

In the receiving end, the received 41 byte frame is separated into the respective 27 five bit quantized samples for the in-phase and quadrature components and 8 bit quantization gain G. The encoded five bit quantized samples are decoded in ac ordance with the quantization gain factor G to result in 27 eight bit signal samples which are informationally equivalent of the decimated in-phase and quadrature signal components, respectively. The decoded samples are interpolated by a factor of 20 to result in 540 samples per frame. These samples are again mixed with $\cos(\Omega t)$ and $\sin(\Omega t)$, respectively, and then low pass filtered using the same filter level (700 Hz) as in the transmitter. Thereafter the mixed and filtered decoded signals 48, 49 are decimated by a factor of 3 to result in 180 samples per frame. The two signals 50, 51 are then summed to produce the 8 kilobyte per second communication signal 26 which is informationally equivalent to the original signal 20.

The unique word 40 is utilized to indicate the type of signal being processed so that the system uses the appropriate compression method and associated parameters with the particular signal. For example the unique word will indicate whether the communication signal is to be processed as voice, fax, modem origination, or modem answer signals.

Figure 7:
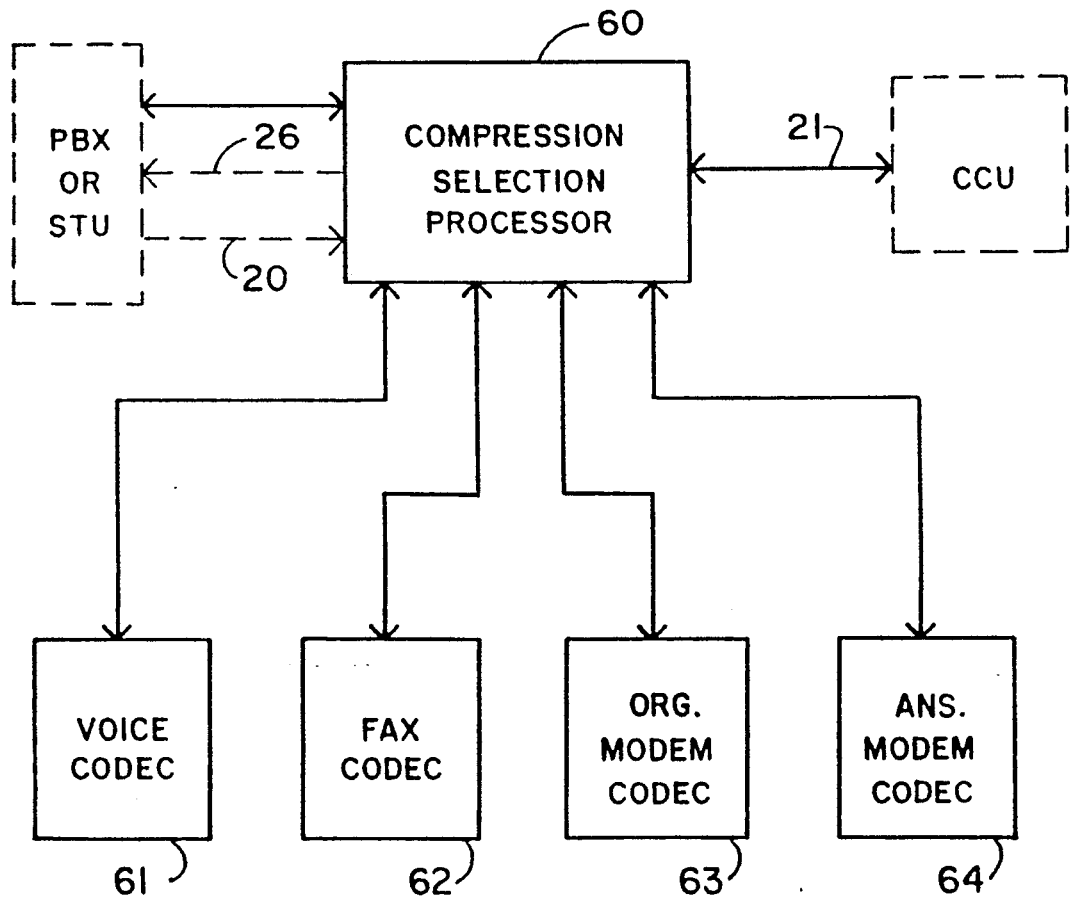
FIG. 7 is a diagrammatic illustration of the implementation of the improved coding system within a radio telecommunication system.

A prior art radio telecommunication system, such as described in U.S. Pat. No. 4,675,863, can be readily modified to utilize the inventive compression method. FIG. 7, schematically depicts the modification which entails the substitution of a compression selection processor (CSP) 60 and associated coding/decoding processors (CODECs) 61, 62, 63, 64 for each voice coder/decoder (CODEC) in the prior art system.

Generally, the CSP 60 utilizes only one of the CODEC's 61-64 at a time. Accordingly, all CODEC's may be embodied in a single microchip with the CSP controlling the parameters and method of encoding to be used for any given communication signal. In fact, all of the processors 60-64 can be integrated into a Texas Instrument Model TMS 32020 Digital Signal Processor to implement both the coding selection and the appropriate coding and decoding processes.

Preferably, in the compression processing of communication signals, the radio telecommunications system utilizes a desired voice signal compression method such as RELP, as a default state. This is preferred since a standard echo cancellor disable tone at either 2225 or 2100 Hz is generated at the initiation of fax and modem transmission.

The compression selection processor 60 monitors the communication signal 20, which is being processed by the voice CODEC 61, to check for an echo canceller disabled tone. This is done by checking the first two reflection coefficients of each frame. If these coefficients are in a specified range for a sufficient number of frames, the system switches from voice processing to processing the communication signal in accordance with the data compression technique of the present invention in the fax and modem CODECs 62-64.

After switching from the voice state, the system initially processes the communication signals with the fax CODEC 62 in accordance with the parameters for fax signal transmission discussed above. The communication signal 20 is then monitored to detect the presence of fax signaling. Specifically, the detection is performed by exploiting the presence of a 300 bit per second half duplex FSK signal (using 1650 and 1815 Hz) which is used for the initial hand shaking between fax machines.

The FSK signal is detected in the following way. A second order LPC analysis is performed on the signal which produces 2 reflection coefficients. Each reflection coefficient is averaged with the corresponding coefficient from the preceding 3 frames. If the average of the coefficients fall within the set of predetermined boundaries, fax transmission is detected and processing continues in accordance with the fax CODEC 62, i.e., with the above disclosed compression technique using fax parameters. If, however, the FSK signal is not detected within a designated window of time such as 4.725 seconds, the system begins to utilize the appropriate modem CODEC 63, 64.

Upon detection of the disabling tone and the absence of the FSK signal detection, the originating modem CODEC 63 is used. The unique word transmitted in each frame is processed by the receiving station to decode the frame as voice, fax, and modem originated or modem answer data respectively. When the receiving station detects reception of a unique word indicating an originating modem signal, the selection processor 60 of the receiving station switches to use the answering modem CODEC 64 for return signals.

In addition to monitoring the transmit direction communication signal 20 for fax signaling, the processor 60 also monitors the energy in the transmit direction. If energy disappears from the transmit direction for a predefined interval, such as 67.5 milliseconds for modem signals and 22.5 seconds for fax signals, the processor notes this and the system returns to its default state, processing the communication signal as a voice signal with the voice CODEC 61. Irrespective of whether the FSK signal is detected, the energy in the transmit direction is continually monitored to determine the end of fax and/or modem signaling to reset the system to voice signaling.

Although the present data compression method has been described in conjunction with a specific radio telecommunication system in a presently preferred embodiment, it can be readily adapted to other systems where parameters, frequencies, carrier medium, frame timing and structure are varied. Additionally the parameters utilized in the data compression method have been determined with reference to compatibility with the systems disclosed in U.S. Pat. No. 4,675,863. It is possible to formulate other sets of parameters which will effectively enable the compression of the communication signal in accordance with the disclosed invention which can be decoded into informationally equivalent data signals in accordance with the disclosed methods.

What is claimed is:

1. In a telecommunication system for communicating communication signals between various locations over a selected carrier medium wherein the communication signal is compressed to facilitate its transmission over the selected carrier medium and the communication signal is reconstructed after reception, an improved ending method comprising:
    transforming the communication signal into two separate components including:
        determining the approximate center frequency $\Omega$ of the communication signal,
        mixing the communication signal with a selected mixing function of $\Omega t$ to product an in-phase component, and
        mixing the communication signal with a selected mixing function of $\Omega t$ to produce a quadrature component; and
    quantizing the separated signal components thereby encoding the signal components into quantized signals to produce a compressed encoded signal for transmission over the selected carrier medium of the communication system.

2. An enclosing method according o claim 1 further comprising:
    filtering each of the in-phase and quadrature components prior to quantizing to remove from each component's frequency domain all frequencies above a selected level.

3. An encoding method according to claim 2 further comprising:
    decimate the respective filtered in-phase and quadrature components by a selected factor Prior to quantizing.

4. An encoding method according to claim 3 further comprising:
    interpolating the communication signal by a selected factor M' prior to mixing the communication signal to produce respective in-phase and quadrature components.

5. An encoding method according to claim 4 wherein:
    the approximate center frequency $\Omega$ of the communication signal is determined by determining the type of communication signal and assigning a preselected value to $\Omega$ based upon the type of signal.

6. In a telecommunication system for communicating communication signals between various locations over a selected carrier medium wherein the communications signal is compressed into a selectively formated encoded signal comprised of quantized in-phase and quadrature signals to facilitate its transmission one the selected carrier medium and the communication signal is reconstructed after reception, an improved decoding method comprising:
    separating the quantized in-phase and quadrature signals of a compressed encoded signal received over the selected carrier medium o the communication system;
    determining the approximate center frequency $\Omega$ of the communication signal being decoded;
    reconstructing the respective in-phase and quadrature signals by quantized decoding;
    mixing the reconstructed in-phase signal with a selected mixing function of $\Omega t$;
    mixing the reconstructed quadrature signal with a selected mixing function of $\Omega t$; and
    combining the two mixed, reconstructed signals to reproduce the decoded, decompressed communication signal.

7. In a telecommunication system for communicating communication signals between various locations over a selected carrier medium wherein the communication signal is compressed to facilitate its transmission over the selected carrier medium and the communication signal is reconstructed after reception, an improved communication method comprising:
    transforming the communication signal into two separate components including:
        determining the approximate center frequency $\Omega$ of the communication signal,
        mixing the communication signal with a selected mixing function of $\Omega t$ to produce an in-phase component, and mixing the communication signal with a selected mixing function of $\Omega t$ to produce a quadrature component;

quantizing each separated signal component to produce a compressed encoded signal transmitting the compressed encoded signal over the selected carrier medium o the communication system;

separating the quantized in-phase and quadrature signals of the compressed encoded signal received over the selected carrier medium of the communication system;

reconstructing the respective in-phase and quadrature signals by quantized decoding;

mixing the reconstructed in-phase signal with a selected mixing function of $\Omega t$;

mixing the reconstructed quadrature signal with a selected mixing function of $\Omega t$; and combining the two mixed, reconstructed signals to reproduce the decoded, decompressed communication signal.

8. A method according o claim 7 further comprising:

filtering each of the in-phase and quadrature components prior to quantizing to remove from each component's frequency domain all frequencies above a selected level; and filtering each of the mixed, reconstructed signals prior to summing to remove from each component's frequency domain all frequencies above said selected filtering level.

9. A method according to claim 8 further comprising:

decimating the respective filed in-phase and quadrature components by a selected factor M prior to quantizing; and interpolating the reconstructed in-phase and quadrature signals by M prior to mixing.

10. A method according to claim 9 further comprising:

interpolate the communication signal by a selected factor M' prior to mixing the communication signal to produce respective in-phase and quadrature components; and decimating the respective mixed and filtered reconstructed in-phase and quadrature signals by M' prior to summing.

11. A method according to claim 10 wherein:

the approximate center frequency $\Omega$ of the communication signal is determined by determining the type of communication signal and assigning a preselected value to $\Omega$ based upon the type of signal.

12. A signal compression encoder or a telecommunication system for communicating communication signals between various locations over a selected carrier medium wherein the communications signal is compressed to facilitate its transmission over the selected carrier medium and the communication signal is reconstructed after reception, the encoder comprising:

means for transforming a communication signal into two separate components including:
means for determining the approximate center frequency $\Omega$ of the communications signal,
means for mixing the communication signal with a selected mixing function of $\Omega t$ to produce an in-phase component, and
means for mixing the communication signal with a selected mixing function of $\Omega t$ to produce a quadrature component;

means for quantizing each separated signal component into a selected number of levels thereby encoding the signal components into quantized signals; and formatting means or formatting the quantized signals to thereby produce a compressed encoded signal for transmission over the selected carrier medium o the communication system.

13. An encoder according to claim 12 further comprising:

means for filtering each of the in-phase and quadrature components prior to quantizing to remove from each component's frequency domain all frequencies above a selected level.

14. An encoder according to claim 13 further comprising:

means or decimating the respective filtered in-phase and quadrature components by a selected factor M prior to quantizing.

15. An encoder according to claim 14 further comprising:

means for interpolating the communication signal by a selected factor M' prior to mixing the communication signal to produce respective in-phase and quadrature components.

16. An encoder according to claim 156 wherein:

said means for determining the approximate center frequency $\Omega$ of the communication signal determines the type of communication signal and assigns preselected values to $\Omega$, M, M', the level of filtering and the number of quantization levels based upon the type of signal.

17. A signal decompression decoder for a telecommunication system for communicating communications signals between various locations over a selected carrier medium wherein the communication signal is compressed into a selectively formatted encoded signal comprised of quantized in-phase and quadrature signals to facilitate its transmission over the selected carrier medium and the communication signal is reconstructed after reception, the decoder comprising:

format decoding means for separating the quantized in-phase and quadrature signals of a compressed encoded signal received over the selected carrier medium o the communication system;

means for determining the approximate center frequency $\Omega$ of the communication signal being decoded;

quantized decoding means for reconstructing the respective in-phase and quadrature signals;

means for mixing the reconstructed in-phase signal with a selected mixing function of $\Omega t$;

means for mixing the reconstructed quadrature signal with a selected mixing function of $\Omega t$; and means for combining the two mixed, reconstructed signals to reproduce the decoded, decompressed communication signal.

18. A decoder according to claim 17 wherein:

said means for determining the approximate center frequency $\Omega$ of the communication signal determines the type of communication signal and assigns a preselected value to $\Omega$ based upon the type of signal.

19. A communication station of a telecommunication system for communicating communication signals between various stations over a selected carrier medium wherein the communication signal is compressed into a selectively formatted encoded signal to facilitate its transmission over the selected carrier medium and the communication signal is reconstructed after reception, the communication station comprising:

at least one signal compression encoder including:
means for transforming a communication signal into two separate components including:
means or determining the approximate center frequency $\Omega$ of the communication signal,
means or mixing the communication signal with a selected mixing function of $\Omega t$ to produce an in-phase component, and
means for mixing the communication signal with a selected mixing function of -106 t to produce a quadrature component;
means for quantizing each separated signal component into a selected number of levels thereby encoding the signal components into quantized signals;
formatting means for formatting the quantized signals to thereby produce a compressed encoded signal for transmission over the selected carrier medium of the communication system; and at least one signal decompression decoder including:
format decoding means for separating the quantized in-phase and quadrature signal of a compressed encoded signal received over the selected carrier medium of the communication system;
means for determining the approximate center frequency $\Omega'$ of the communication signal being decoded;
quantized decoding means or reconstructing the respective in-phase and quadrature signals in accordance a selected number of quantization levels;
means or mixing the reconstructed in-phase signal with a selected mixing function of $\Omega' t$;
means for mixing the reconstructed quadrature signal with as elected mixing function of $\Omega' t$; and
means for combining the two mixed, reconstructed signals to reproduce the decoded, decompressed communication signal.

20. A plurality of communication stations according to claim 19 comprising a telecommunication system wherein one of said stations is a base station.

21. A communication station according to claim 19 wherein:
said at least on signal compression encoder further comprises means of filtering each of the in-phase and quadrature components prior to quantizing to remove from each component's frequency domain all frequencies above a selected level; and
said at least one signal compression decoder further comprises means or filtering each of the mixed, reconstructed signals prior to summing to remove from each component's frequency domain all frequencies above a selected filtering level.

22. A communication station according to claim 21 wherein:
said at least one signal compression encoder further comprises means for decimating the respective filtered in-phase and quadrature components by a selected factor M prior to quantizing; and
said at least on signal compression encoder further comprises means for interpolate the reconstructed in-phase and quadrature signal by a m prior to mixing.

23. A communication station according o claim 22 wherein:
said at least one signal compression encoder further comprises means or interpolating the communications signal by a selected factor M' prior to mixing the communication signal to produce respective in-phase and quadrature components; and
said at least one signal compression decoder further comprises means for decimating the respective mixed and filtered reconstructed in-phase and quadrature signals by m' prior to summing.

24. A communication station according o claim 23 wherein:
said at least one encoder's means or determining the approximate center frequency $\Omega$ o the communication signal determines the type o communications signal and assigns persecuted values to $\Omega$, M, M', the level of filtering and the number of quantization levels based upon the type of signal; and
said at least one decoder's means for determining the approximate center frequency $\Omega$ of the communications signal determines the type of communications signal and assigns preselected values to $\Omega'$, m, m', the level of filtering and the number of quantization levels based upon the type of signal.

25. A communications station for a telecommunication system for communicating communication signals between various stations over as elected carrier medium wherein the communications signal si compressed into a selectively formatted encoded signal o facilitate its transmission over the selected carrier medium and the communication signal is reconstructed after reception, the communication station comprising:

a plurality of signal compression encoders and signal decompression decoders for encoding and eroding a selected type of signal;
means for selecting one of said encoders for processing a signal to be transmitted in accordance with the signal type;
means for selecting one of said decoders for processing a received signal in accordance with the signal type;
at least one of said signal compression encoders including:
means for transforming a communication signal into two separate components including:
means for mixing the communication signal with a selected mixing function of $\Omega t$ to produce an in-phase component where $\Omega$ is a preselected value, and
means for mixing the communication signal with a selected mixing function of $\Omega t$ to produce a quadrature component;
mean for quantizing each separated signal component into a selected number of levels thereby encoding the signal components into quantized signals;
formatting means for formatting the quantized signals to thereby produce a compressed encoded signal for transmission over the selected carrier medium of the communication system; and
at least one of said signal decompression decoders including:
format decoding mean for separating the quantized in-phase and quadrature signals of a compressed encoded signal received over the sleeted carrier medium of the communication system;

quantized decoding means of for reconstructing the respective in-phase and quadrature signals in accordance with the gain component and a selected number of quantization levels;

means for mixing the reconstructed in-phase signal with a selected mixing function of $\Omega't$ where $\Omega'$ is a preselected value;

means for mixing the constructed quadrature signal with a selected mixing function of $\Omega't$; and means for combining the two mixed, reconstructed signals to reproduce the decoded, decompressed communication signal.

26. A plurality of communications stations according to claim 25 comprising a telecommunicating system wherein one of said stations is a base station.

27. A communication station according to claim 25 wherein:

said at least one signal compression encoder further comprises means for filtering each of the in-phase and quadrature components prior to quantizing to remove from each component's frequency domain all frequencies above a selected level; and said at least one signal compression decoder further comprises means for filtering each of the mixed, reconstructed signals prior to summing to remove from each component's frequency domain all frequencies above a selected filtering level.

28. A communication station according to claim 27 wherein:

said at least one signal compression encoder further comprises means for decimating the respective filtered in-phase and quadrature components by a s elected factor M prior to quantizing; and said at least one signal compression decoder further comprises means for interpolating the reconstructed in-phase and quadrature signals by m prior to mixing.

29. A communication station according to claim 28 wherein:

said at least one signal compression encoder further comprises means for interpolating the communication signal by a selected factor M' prior to mixing the communication signal to produce respective in-phase and quadrature components; and said at least one signal compression decoder further comprises means for decimating the respective mixed and filtered reconstructed in-phase and quadrature signals by m' prior to summing.

30. A communication station according to claim 29 wherein:

said encoder selecting means determines the type o communication signal and assigns to said at least one encoder preselected values for $\Omega$, M, M', the level of filtering and the number of quantization levels base upon the type of signal; and said decoder selecting means determines the type of communication signal nd assigns to said at least one decoder preselected values for $\Omega'$, m, m', at the level of filtering and number of quantization levels based upon the type of signal.

31. A telecommunication system for communicating communications signals between various stations over a selected carrier medium wherein the communication signal is compressed into a selectively formatted encoded signal to facilitate its transmission over the selected carrier medium and the communication signal is reconstructed after reception, the system comprising:

a first station having at least one signal compression encoder including:

means for transforming a communication signal into two separate components including:

means for determining the approximate center frequency $\Omega$ of the communication signal, means for mixing the communication signal with a selected mixing function of $\Omega t$ to produce an in-phase component, and means for mixing the communication signal with a selected mixing function of $\Omega t$ to produce a quadrature component;

means for quantizing each separated signal component into a selected number of levels thereby encoding the signal components into quantized signals; and formatting means for formatting the quantized signals to thereby produce a compressed encoded signal for transmission over the selected carrier medium of the communication system; and a second station for receiving the compressed encoded signal from said first station having at least one signal decompression decoder including:

format decoding means for separating the quantized in-phase and quadxature signals of a compressed encoded signal received over the selected carrier medium of the communication system;

means for determining the approximate center frequency $\Omega$ of the communication signal being decoded;

equalize decoding means for reconstructing the receptive in-phase and quadrature signals;

means for mixing the reconstructed in-phase signal with a selected mixing function of $\Omega t$;

means for mixing the reconstructed quadrature signal with a selected mixing function of $\Omega t$; and means for combining the two mixed, reconstructed signals to reproduce the decoded, decompressed communication signal.

32. A telecommunication system according to claim 31 wherein one of said stations is a base station.

33. A telecommunication system according o claim 32 wherein:

said at least one signal compression encoder further comprises means for filtering each of the in-phase and quadrature components prior to quantizing to remove from each component's frequency domain all frequencies above a selected level; and said at least one signal compressing decoder further comprises means for filtering each of the mixed, reconstructed signals prior to summing to remove from each component's frequency domain all frequencies above said selected filtering level.

34. A telecommunication system according to claim 33 wherein:

said at least one signal compression encoder further comprises means for decimating the respective filtered in-phase and quadrature components by a selected factor M prior to quantizing; and said at least one signal compression decoder further comprises means for interpolating the reconstructed in-phase and quadrature signals by M prior to mixing.

35. A telecommunication system according to claim 34 wherein:

said at least one signal compression encoder further comprises means for interpolating the communication signal by a selected factor M' prior to mixing the communication signal to produce respective in-phase and quadrature components; and said at least one signal compression decoder further comprises means for decimating the respective mixed and filtered reconstructed in-phase and quadrature signals by M' priro to summing.

36. A telecommunication system according to claim 35 wherein:

said means for determining the approximate center frequency $\Omega$ of the communication signal determines the type of communication signal and assigns preselected values to $\Omega$, M, M', the level filtering and the number of quantization levels based upon the type of signal.

* * * * *

UNITED STATES PATENT AND TRADEMARK OFFICE
CERTIFICATE OF CORRECTION

PATENT NO. : 5,072,308　　　　　　　　　　　Page 1 of 11

DATED : December 10, 1991

INVENTOR(S) : Lin et al.

It is certified that error appears in the above-identified patent and that said Letters Patent is hereby corrected as shown below:

At column 1, line 56, delete "rual" and insert therefor --rural--.

At column 1, line 66, delete "stationery" and insert therefor --stationary--.

At column 2, line 58, after the word 'object' insert --of--.

At column 3, line 5, delete "doman" and insert therefor --domain--.

At column 3, line 38, delete "select port ions of" and insert therefor --selected portions of--.

At column 4, line 3, delete "told" and insert therefor --fold--.

At column 4, line 16, delete "o" and insert therefor --of--.

At column 4, line 19, delete "eh".

At column 4, line 19, delete "paris." and insert therefor --pairs--.

UNITED STATES PATENT AND TRADEMARK OFFICE
CERTIFICATE OF CORRECTION

PATENT NO. : 5,072,308                          Page 2 of 11

DATED : December 10, 1991

INVENTOR(S) : Lin et al.

It is certified that error appears in the above-identified patent and that said Letters Patent is hereby corrected as shown below:

At column 4, line 19, delete "item" and insert therefor --time--.

At column 4, line 22, delete "tie" and insert therefor --time--.

At column 4, line 30, delete "concerted" and insert therefor --converted--.

At column 4, line 59, delete "application" and insert therefor --Application--.

At column 6, line 53, delete "180" and insert therefor --1800--.

At column 7, line 1, delete "20".

At column 8, line 47, delete "cancellor" and insert therefor --canceler--.

In claim 1, column 9, line 58, delete "ending" and insert therefor --encoding--.

In claim 1, column 9, line 64, delete "product" and insert therefor --produce--.

UNITED STATES PATENT AND TRADEMARK OFFICE
CERTIFICATE OF CORRECTION

PATENT NO. : 5,072,308

DATED : December 10, 1991

INVENTOR(S) : Lin et al.

It is certified that error appears in the above-identified patent and that said Letters Patent is hereby corrected as shown below:

In claim 2, column 10, line 6, delete "enclosing" and insert therefor --encoding--.

In claim 2, column 10, line 6, delete "o" and insert therefor --to--.

In claim 3, column 10, line 14, delete "decimate" and insert therefor --decimating--.

In claim 3, column 10, line 15, delete "Prior" and insert therefor --M prior--.

In claim 6, column 10, line 32, delete "communications" and insert therefor --communication--.

In claim 6, column 10, line 35, delete "one" and insert therefor --over--.

In claim 6, column 10, line 41, delete "o" and insert therefor --of--.

In claim 6, column 10, line 46, delete "quantized" and insert therefor --quantize--.

In claim 7, column 11, line 7, delete "o" and insert therefor --of--.

UNITED STATES PATENT AND TRADEMARK OFFICE
CERTIFICATE OF CORRECTION

PATENT NO. : 5,072,308

DATED : December 10, 1991

INVENTOR(S) : Lin et al.

It is certified that error appears in the above-identified patent and that said Letters Patent is hereby corrected as shown below:

In claim 7, column 11, line 14, delete "quantized" and insert therefor --quantize--.

In claim 8, column 11, line 22, delete "o" and insert therefor --to--.

In claim 9, column 11, line 32, delete "filed" and insert therefor --filtered--.

In claim 10, column 11, line 39, delete "interpolate" and insert therefor --interpolating--.

In claim 12, column 11, line 51, delete "or" and insert therefor --for--.

In claim 12, column 11, line 54, delete "communications" and insert therefor --communication--.

In claim 12, column 12, line 5, delete "or" and insert therefor --for--.

In claim 12, column 12, line 7, delete "o" and insert therefor --of--.

In claim 14, column 12, line 17, delete "or" and insert therefor --for--.

UNITED STATES PATENT AND TRADEMARK OFFICE
CERTIFICATE OF CORRECTION

PATENT NO. : 5,072,308

DATED : December 10, 1991

INVENTOR(S) : Lin et al.

It is certified that error appears in the above-identified patent and that said Letters Patent is hereby corrected as shown below:

In claim 16, column 12, line 26, delete "156" and insert therefor --15--.

In claim 17, column 12, line 34, delete "communications" and insert therefor --communication--.

In claim 17, column 12, line 45, delete "o" and insert therefor --of--.

In claim 17, column 12, line 49, delete "quantized" and insert therefor --quantize--.

In claim 19, column 12, line 64, delete "of" and insert therefor --for--.

In claim 19, column 13, line 13, delete "-106 t" and insert therefor --$\Omega$t--.

In claim 19, column 13, line 26, delete "signal" and insert therefor --signals--.

In claim 19, column 13, line 33, delete "quantized" and insert therefor --quantize--.

In claim 19, column 13, line 33, delete "or" and insert therefor --for--.

UNITED STATES PATENT AND TRADEMARK OFFICE
CERTIFICATE OF CORRECTION

PATENT NO. : 5,072,308

DATED : December 10, 1991

INVENTOR(S) : Lin et al.

It is certified that error appears in the above-identified patent and that said Letters Patent is hereby corrected as shown below:

In claim 19, column 13, line 35, after 'accordance' insert --with--.

In claim 19, column 13, line 37, delete "or" and insert therefor --for--.

In claim 19, column 13, line 40, delete "as elected" and insert therefor --a selected--.

In claim 21, column 13, line 49, delete "on" and insert therefor --one--.

In claim 21, column 13, line 50, delete "of" and insert therefor --for--.

In claim 21, column 13, line 55, delete "of" and insert therefor --for--.

In claim 22, column 13, line 65, delete "on" and insert therefor --one--.

In claim 22, column 13, line 66, delete "interpolate" and insert therefor --interpolating--.

In claim 22, column 13, line 67, delete "a".

UNITED STATES PATENT AND TRADEMARK OFFICE
CERTIFICATE OF CORRECTION

PATENT NO. : 5,072,308

DATED : December 10, 1991

INVENTOR(S) : Lin et al.

It is certified that error appears in the above-identified patent and that said Letters Patent is hereby corrected as shown below:

In claim 22, column 13, line 67, delete "m" and insert therefor --M--.

Column 14, line 1, delete "o", and insert therefor --to--.

Column 14, line 4, claim 23, delete "or", and insert therefor --for--.

In claim 24, column 14, line 12, delete "o", and insert therefor --to--.

In claim 24, column 14, line 14, delete "or", and insert therefor --for--.

In claim 24, column 14, line 15, delete "o", and insert therefor --of--.

In claim 24, column 14, line 16, delete "o", and insert therefor --of--.

In claim 24, column 14, line 16, delete "communications", and insert therefor --communication--.

In claim 24, column 14, line 17, delete "persecuted" and insert therefor --preselected--.

UNITED STATES PATENT AND TRADEMARK OFFICE
CERTIFICATE OF CORRECTION

PATENT NO. : 5,072,308            Page 8 of 11
DATED : December 10, 1991
INVENTOR(S) : Lin et al.

It is certified that error appears in the above-identified patent and that said Letters Patent is hereby corrected as shown below:

In claim 24, column 14, line 21, delete "$\Omega$" and insert therefor --$\Omega'$--.

In claim 24, column 14, line 21-22 delete "communications" and insert therefor --communication--.

In claim 24, column 14, line 23, delete "m" and insert therefor --M--.

In claim 24, column 14, line 24, delete "m'" and insert therefor --M'--.

In claim 25, column 14, line 26, delete "communications" and insert therefor --communication--.

In claim 25, column 14, line 28, delete "as elected" and insert therefor --a selected--.

In claim 25, column 14, line 29, delete "communications" and insert therefor --communication--.

In claim 25, column 14, line 29, delete "si" and insert therefor --is--.

In claim 25, column 14, line 30, delete "o" and insert therefor --to--.

UNITED STATES PATENT AND TRADEMARK OFFICE
CERTIFICATE OF CORRECTION

PATENT NO. : 5,072,308

DATED : December 10, 1991

INVENTOR(S) : Lin et al.

It is certified that error appears in the above-identified patent and that said Letters Patent is hereby corrected as shown below:

In claim 25, column 14, line 35, delete "eroding" and insert therefor --decoding--.

In claim 25, column 14, line 54, delete "mean" and insert therefor --means--.

In claim 25, column 14, line 65, delete "mean" and insert therefor --means--.

In claim 25, column 14, line 67, delete "sleeted" and insert therefor --selected--.

In claim 25, column 15, line 1, delete "quantized" and insert therefor --quantize--.

In claim 25, column 15, line 1, delete "of".

In claim 25, column 15, line 8, delete "constructed" and insert therefor --reconstructed--.

In claim 26, column 15, line 13, delete "communications" and insert therefor --communication--.

In claim 26, column 15, line 14, delete "telecommunicating" and insert therefor --telecommunication--.

UNITED STATES PATENT AND TRADEMARK OFFICE
CERTIFICATE OF CORRECTION

PATENT NO. : 5,072,308
DATED : December 10, 1991
INVENTOR(S) : Lin et al.

It is certified that error appears in the above-identified patent and that said Letters Patent is hereby corrected as shown below:

In claim 28, column 15, line 33, delete "s".

In claim 28, column 15, line 34, delete "elected" and insert therefor --selected--.

In claim 28, column 15, line 36, delete "m" and insert therefor --M--.

In claim 29, column 15, line 49, delete "m'" and insert therefor --M'--.

In claim 30, column 15, line 52, delete "o" and insert therefor --of--.

In claim 30, column 15, line 56, delete "base" and insert therefor --based--.

In claim 30, column 15, line 58, delete "nd" and insert therefor --and--.

In claim 30, column 15, line 59, delete "at".

In claim 30, column 15, line 59, delete "m, m'" and insert therefor --M, M'--.

In claim 30, column 15, line 60, before the word 'number' insert --the--.

UNITED STATES PATENT AND TRADEMARK OFFICE
CERTIFICATE OF CORRECTION

PATENT NO. : 5,072,308

DATED : December 10, 1991

INVENTOR(S) : Lin et al.

It is certified that error appears in the above-identified patent and that said Letters Patent is hereby corrected as shown below:

In claim 31, column 15, line 63, delete "communications" and insert therefor --communication--.

In claim 31, column 16, line 26, delete "quadxature" and insert therefor --quadrature--.

In claim 31, column 16, line 33, delete "equalize" and insert therefor --quantize--.

In claim 31, column 16, line 34, delete "receptive" and insert therefor --respective--.

In claim 33, column 16, line 45, delete "o" and insert therefor --to--.

In claim 33, column 16, line 52, delete "compressing" and insert therefor --compression--.

In claim 36, column 18, line 6, after the word 'level' insert --of--.

Signed and Sealed this

Twentieth Day of April, 1993

*Attest:*

MICHAEL K. KIRK

*Attesting Officer*     Acting Commissioner of Patents and Trademarks